J. N. JACOBSEN.
BUTTER MOLDING MACHINE.
APPLICATION FILED NOV. 12, 1910.

1,012,556.

Patented Dec. 19, 1911.
5 SHEETS—SHEET 1.

WITNESSES:
J. A. Brophy
E. B. Marshall

INVENTOR
Jens N. Jacobsen
BY
ATTORNEYS

J. N. JACOBSEN.
BUTTER MOLDING MACHINE.
APPLICATION FILED NOV. 12, 1910.

1,012,556.

Patented Dec. 19, 1911.
5 SHEETS—SHEET 4.

WITNESSES:
J. A. Brophy
E. B. Marshall

INVENTOR
Jens N. Jacobsen
BY Munn & Co
ATTORNEYS

J. N. JACOBSEN.
BUTTER MOLDING MACHINE.
APPLICATION FILED NOV. 12, 1910.

1,012,556.

Patented Dec. 19, 1911.
5 SHEETS—SHEET 5.

WITNESSES:

INVENTOR
Jens N. Jacobsen
BY
ATTORNEYS

UNITED STATES PATENT OFFICE.

JENS NIELSEN JACOBSEN, OF EUREKA, CALIFORNIA.

BUTTER-MOLDING MACHINE.

1,012,556. Specification of Letters Patent. Patented Dec. 19, 1911.

Application filed November 12, 1910. Serial No. 592,037.

*To all whom it may concern:*

Be it known that I, JENS N. JACOBSEN, a citizen of Germany, and a resident of Eureka, in the county of Humboldt and State of California, have invented a new and Improved Butter-Molding Machine, of which the following is a full, clear, and exact description.

My invention relates to butter molding machines, and it has for its object to provide one having a cutter device mounted on a frame in which a shaft is journaled, there being a second frame movable relatively to the first-mentioned frame, in which the butter may be packed to be cooled, there being means for storing the butter in a series of layers on the second-mentioned frame, the butter in each layer being disposed on slats which are dropped at the end of the second-mentioned frame, when the block which travels on runners on the said second mentioned frame is moved to convey the slats and the butter in the direction of the cutter. This block is detachably connected with sprocket chains which travel on wheels on a shaft disposed in open bearings in the second-mentioned frame, and on sprocket wheels on the first-mentioned shaft.

Other objects of the invention are to provide means for raising the layers of butter by means of transverse members having threaded openings in which mesh screws journaled in bearings in the frame, there being means for rotating the screws simultaneously; and to provide means for alternately moving the butter and the particular type of cutter device set forth.

Additional objects of the invention will appear in the following complete description.

In this specification I will describe the preferred form of my invention, it being understood that the scope of the invention is defined in the appended claims.

In the drawings similar reference characters refer to similar parts in all the views, in which—

Fig. 3 is an end view of the cutting and driving mechanism working toward the right; Fig. 8 is a fragmentary view showing the adjustable means for connecting the link 97 to the crank 96.

By referring to the drawings it will be seen that a frame 10 is provided, an axle 11 being journaled in bearings 12 in the said frame, wheels 13 being mounted on the said axle 11. At a distance from the bearings 12 a shank 14 of a caster 15 is journaled in a vertical bearing 24 mounted between end members 29 in the frame 10. The frame 10 has horizontal bottom members 16, vertical end members 17 and upper horizontal members 18, the upper horizontal members serving as runners. In bearings 19 in the horizontal members 16 are journaled screw members 20, said screws 20 meshing in threaded openings in the ends of transverse members 21, the lower slides 22 being disposed on the said transverse members 21. Sprocket wheels 23 are mounted on the screws 20 respectively.

Figures 1, 2:
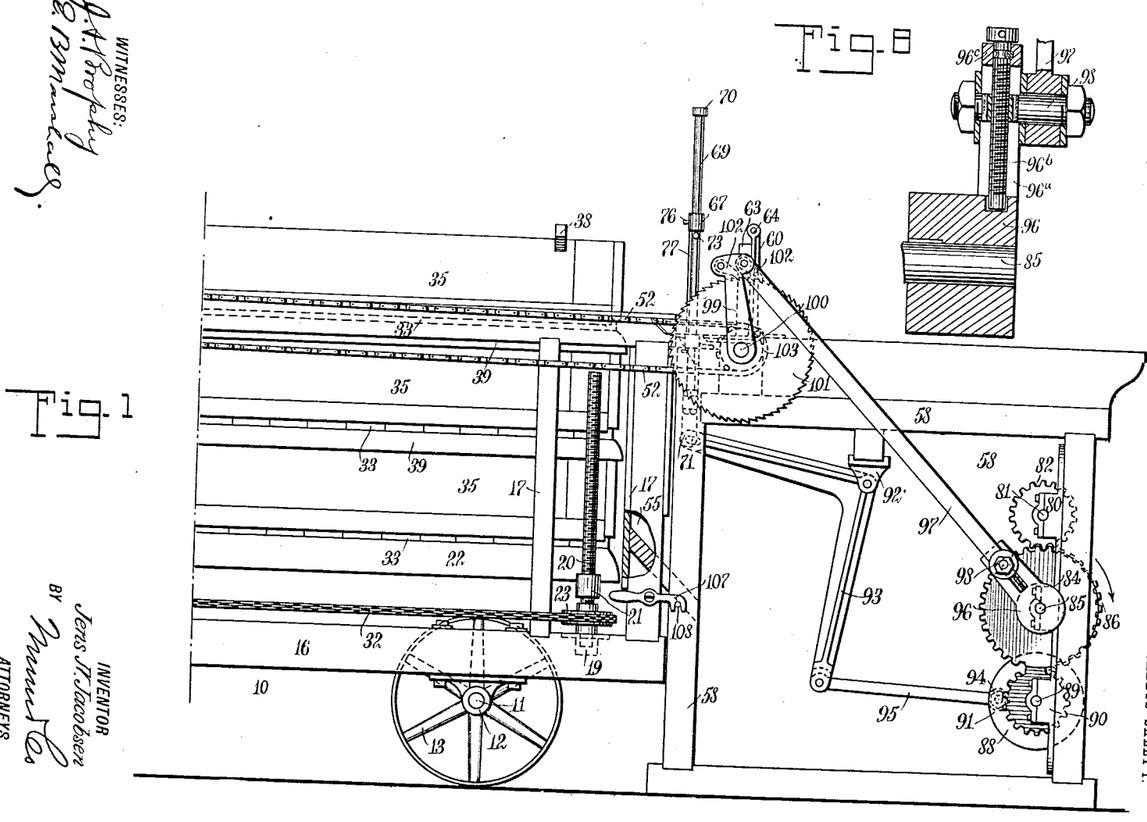
Figures 1 and 1ª show a side elevation of the invention.
Fig. 2 is a plan view of the device shown in Figs. 1 and 1ª.
Figures 1, 9, 10:
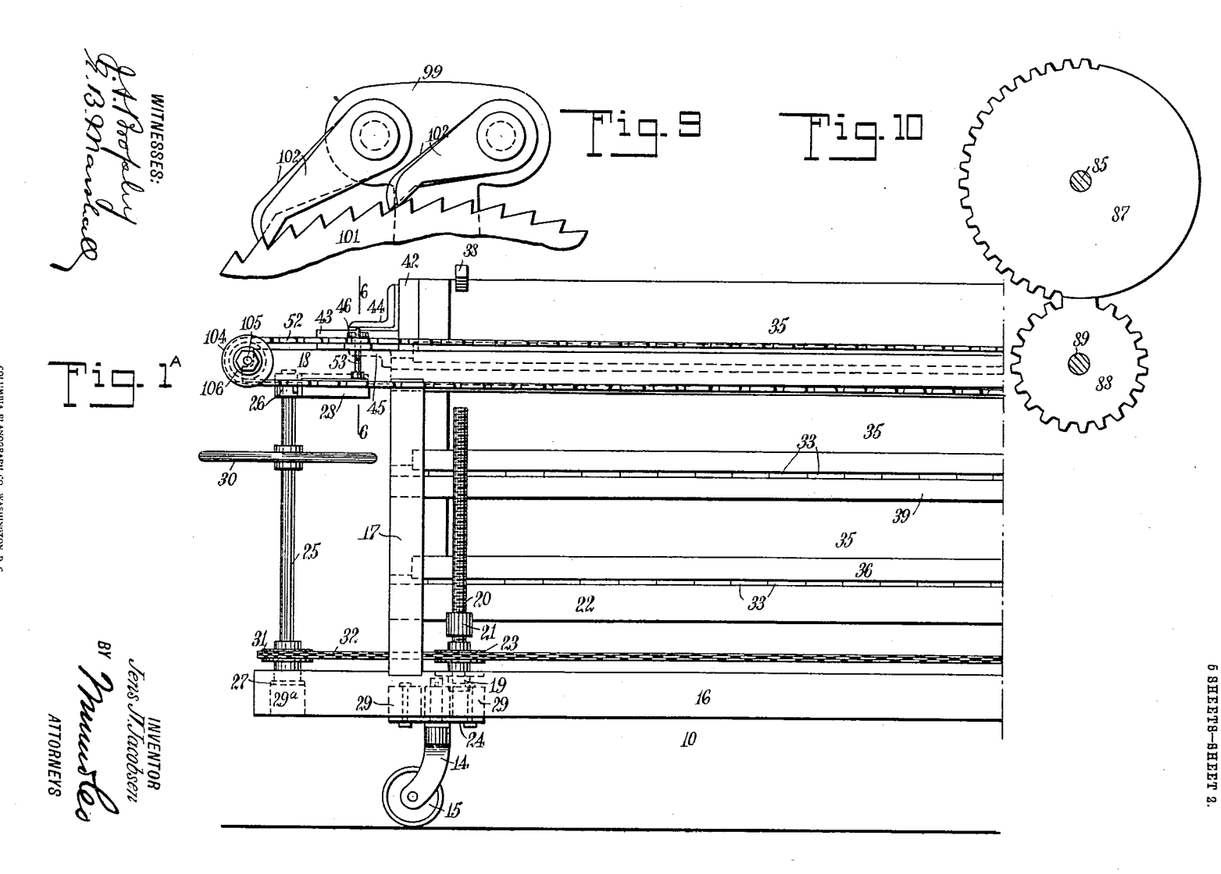
Fig. 9 is an enlarged fragmentary view showing the four pawls mounted on the arm.
Fig. 10 is an enlarged view showing the gear wheels 87 and 88.
Figure 2:
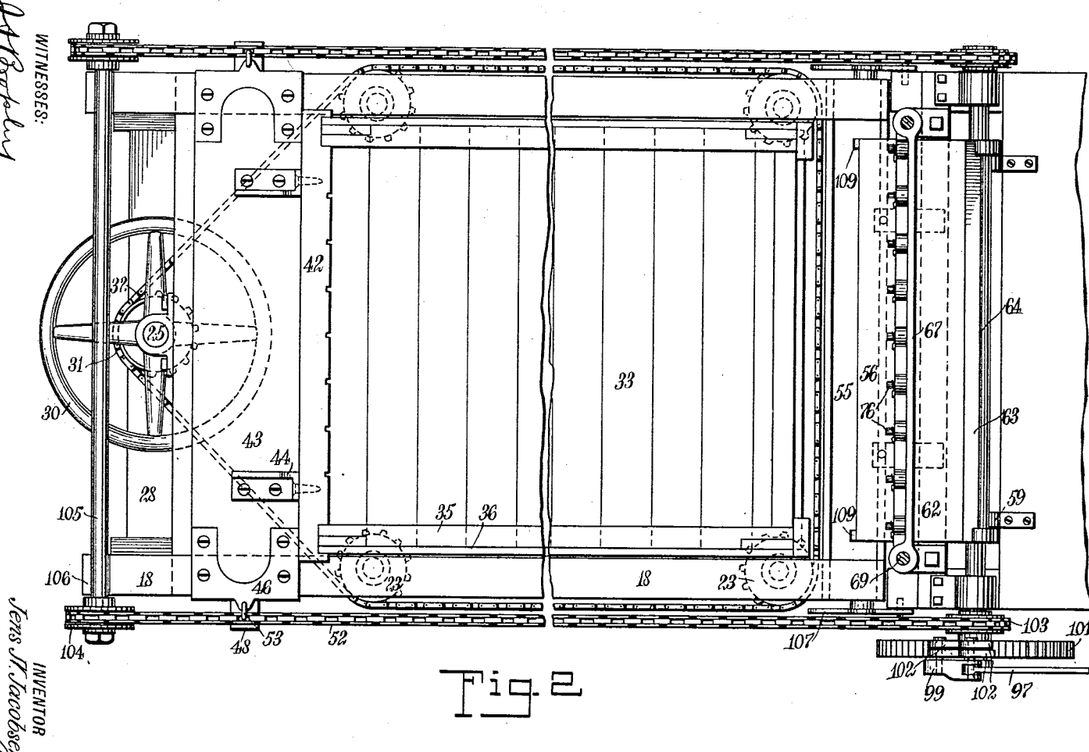
Figure 4:
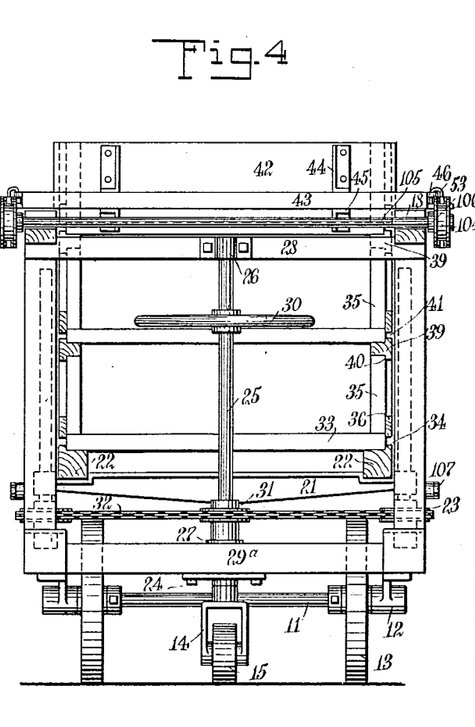
Fig. 4 is an end view of Figs. 1 and 1ª working toward the right.
Figure 5:
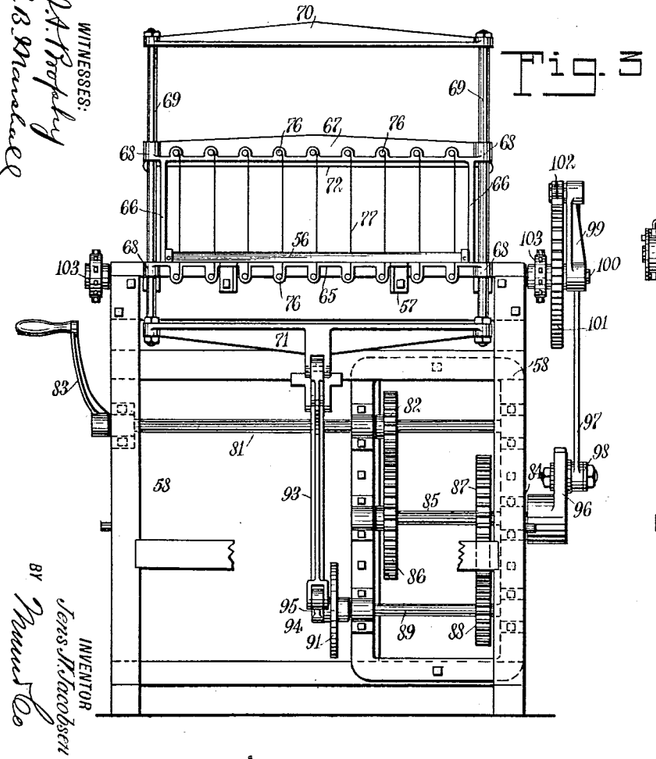
Fig. 5 is a fragmentary sectional view showing the chute for receiving the slats at the end of the device; the block which forces the slats and the butter disposed thereon to the right; wires for cutting the butter; and the bracket and shelves for receiving the butter after it has been cut into the desired shape.
Figure 6:
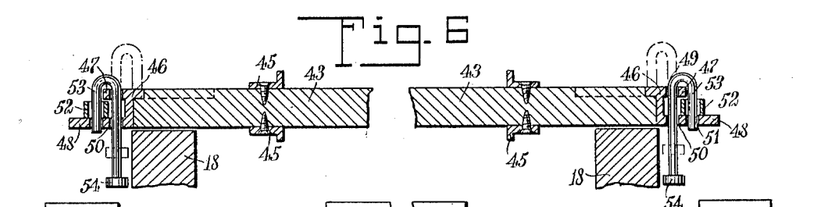
Fig. 6 is a sectional view on the line 6—6 of Fig. 1ª.

By referring to Fig. 4 of the drawings it will be seen that a shaft 25 is journaled in bearings 26 and 27 in transverse end members 28 and 29ª of the frame 10. A hand wheel 30 is secured to this shaft 25, a sprocket wheel 31 being also secured to the said shaft. A sprocket chain 32 is disposed around the sprocket wheels 23, 31, as best shown in Fig. 2 of the drawings.

It will be understood that as the hand wheel is rotated in one direction the screws 20 will be rotated to move the transverse members 21 upwardly, and that as the hand wheel 30 is moved in the opposite direction, the screws 20 will be rotated to lower the transverse members 21. On the slides 22 are disposed a series of slats 33 to form a floor of a compartment. The slides 22 are recessed at the inner sides at 34, to prevent the slats 33 from becoming displaced. On the slats at their ends are disposed side members 35, these side members 35 forming the sides of the compartment having the floor formed by the slats 33. Secured to the side members 35 at their lower ends are flanges 36 which extend below the sides 35 and against the ends of the slats 33. These flanges 36 at their ends, are disposed in close proximity to the inner sides of the vertical members 17 on the frame 10, and the said vertical members 17 prevent the side members 35 from becoming displaced. Between the ends of the side members 35 are disposed end members 37, and when the compartment formed by the slats 33 the sides 35 and the ends 37 is being filled with butter, the sides are held together by means of clamps 38, which extend from one of the side members to the other.

On the side members 35 are disposed additional slides 39, respectively, these slides 39 having depending flanges 40, which engage the outer surfaces of the side members 35, the slides 39 also having upwardly extending flanges 41 which engage the ends of the slats 33 which are disposed on the said slides 39. The side members 35 are disposed on the slats 33 in the manner which has been described and the slides 39 are disposed on the second set of side members 35.

In the manner which has been described, any number of compartments may be built up, each compartment having a floor formed by the transversely disposed slats 33, which rest on the slides 22 and 39.

In filling the compartments having the floors formed by the slats 33, the lowermost compartment is first filled with butter; then the transverse members 21 are lowered by means of the screws, sprocket wheels and sprocket chain, when the set of slides 39 is disposed on the side members 35, a set of slats 33 is disposed on the slides 39, the side members of the second compartment are disposed in place, the end members 37 are disposed in position, and the second compartment thus formed is held in place by the clamps 38 while being filled with butter.

When the butter has been disposed in the second compartment the transverse members 21 are again lowered in the manner which has been described, and a third compartment is filled with butter.

On the runners 18 is disposed a block 43 to which is secured a block 42, which is held in position by a bracket 44. A depending bracket 45 is also secured to the block 43. To the sides of the horizontal block 43 are secured members 46, each of these members having two outwardly extending portions 47 and 48, the upper outwardly extending portion 47 having an opening 49, and the lower outwardly extending portion having openings 50 and 51. The portions 48 extend beyond the portion 47 and are adapted to support the endless sprocket chains 52. A bent pin 53 is provided for each of the members 46, these pins 53 having heads 54, and extending upwardly through the orifices 50 and 49, where the pins 53 are bent downwardly, the other terminal of the pins 53 being adapted to project through links in the endless sprocket chains 52, and in the orifices 51.

As has been stated, the members 46 are mounted on each side of the horizontal block 43, and are provided to receive bent pins 53, the bent pins being adapted to engage the endless sprocket chains 52 so that the horizontal block 43 may be connected and disconnected with the sprocket chain 52 as desired. When the head wheel 30 is rotated to move the transverse members 21 so that a series of slats 33 will be in alinement with the depending brackets 45 on the horizontal block 43, and when the said block 43 is moved toward the right, the said brackets 45 will push the slats 33 to the right, where they will be disengaged from the butter by the flanges 109, the slats 33 falling down a chute 55 in the end of the frame 10. The butter deposited on the slats is pushed on the shelf 56 where it is engaged by the cutting device which will hereinafter be described. When the block 42 has been moved to the right, and has forced the butter deposited on the slats 33 past the cutter device, and has pushed the slats 33 into the chute 55, the pins 53 may be raised and freed from the endless sprocket chain 52 so that the block 42 may be moved by hand to the left of the device to be again connected with the chain 52 to move to the right the butter deposited on the series of slats disposed immediately below the slats which have just been pushed into the chute 55. In this way the several layers of butter may be moved past the cutting device to be cut the desired size. The said shelf 56 is mounted on flanges 65$^a$, secured to the transverse member 65 mounted on brackets 57. Hinged to the frame 58 there is a member 59 having arms 60, and 61. A shelf member 62 is secured to the arms 61, the shelf member 63 resting on the arms 60. The arms 60 at their outer terminals are connected by a handle rod 64. The transverse member 65 forms with the transverse member 67 and the standards 66 a rectangular frame. The transverse members 65 and 67 have bearings 68 at their ends in which are disposed rods 69, the rods 69 being connected at their upper terminals by a transverse member 70, and at their lower terminals by a transverse member 71. To the rods 69 is secured, between the transverse members 65 and 67, a wire 72, this wire 72 having the ends wound around screws 73, which mesh in threaded orifices 74 in the rods 69.

Figure 7:
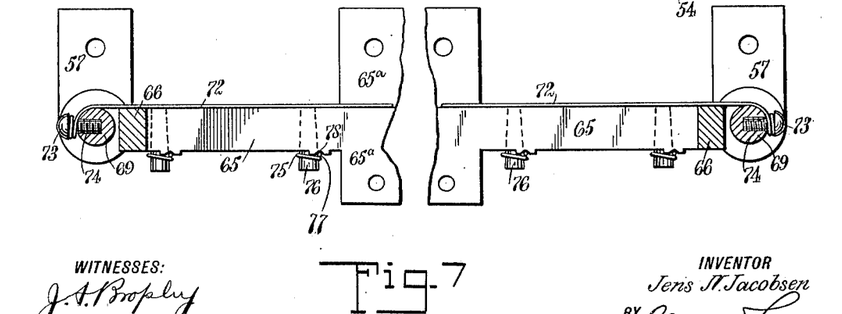
Fig. 7 is a sectional plan view showing the method of mounting the wires on their supports.

As will be seen by referring to Fig. 7 of the drawings the wire 72 is stretched from one of the rods 69 to the other. The transverse members 65 and 67 have orifices 75 in which are disposed studs 76, vertical wires 77 being wound on these studs 76, the wires 77 being disposed in recesses 78 in the said transverse members 65 and 67, as shown in Fig. 7 of the drawings. These vertical wires 77 may at all times be held taut by turning the studs 76 in a manner which will be readily understood. The vertical wires 77 are disposed upwardly through openings 79 in the shelf 56, the horizontal wire 72 being disposed to move downwardly beyond the said shelf 56.

Journaled in bearings 80 in the frame 58 is a shaft 81, to which is secured a gear wheel 82. A crank 83 is secured to the shaft 81 beyond the frame 58, by which means the shaft 81 may be rotated.

In bearings 84 in the frame 58 there is journaled a shaft 85, to which is secured a gear wheel 86, which meshes with the gear wheel 82. Another wheel 87 is secured to the shaft 85, the wheel 87 having gear teeth extending approximately half around its periphery, the said wheel 87 being used to produce an intermittent motion in the members which it drives. The teeth on the wheel 87 are adapted to mesh with a gear wheel 88, a portion of the gear wheel 88 being formed to the shape of the periphery of the blank portion of the gear wheel 87 so that it will stop and permit the gear wheel 87 to slide upon its periphery without producing motion in the gear wheel 88 until the teeth of the wheel 87 engage the teeth of the gear wheel 88. In this way the shaft 89 journaled in bearings 90 in the frame 58 and to which the gear wheel 88 is secured is locked against rotation except when the teeth on the wheel 87 mesh with the teeth on the gear wheel 88. A crank disk 91 is also secured to the shaft 89. To a fulcrum 92 on the frame 58, there is pivoted a bell crank lever 93 one arm of which is connected with a crank 94 on the crank disk 91 by a link 95. The other arm of this bell crank lever 93, is articulated to the transverse members 71. A crank 96, having a slotted arm 96ª, is secured to the shaft 85, a screw 96ᵇ being journaled in a bearing in the crank 96 and in a bearing 96ᶜ at the end of the slotted arm 96ª, this screw 96ᵇ meshing in a threaded orifice in the bolt 98 to which the link 97 is articulated. It will be seen that by rotating the screw 96ᵇ the bolt may be moved to or from the axis of the shaft 85 to obtain the desired adjustment. The other end of the link 97 is articulated to an arm 99 mounted loosely on the hub of the ratchet wheel 101. The ratchet wheel 101 is secured to a shaft 100, a series of four pawls 102 of varying lengths being pivoted to the arm 99, for engaging said ratchet wheel 101. The four pawls 102 are arranged as to length to correspond with one quarter of the pitch of the teeth of the ratchet wheel 101 so that one of the pawls will fit snugly against one of the ratchet teeth every time the ratchet wheel is rotated to the left a distance equal to one-quarter of the pitch of the teeth of the ratchet wheel. With this arrangement the exact distance of rotation of the ratchet wheel and exact distance of travel of the block 42 at each throw of the crank 96 may be regulated. The sprocket wheels 103 are secured to the shaft 100, the sprocket chains 52 being mounted on the said sprocket wheels 103, these sprocket chains 52 being also disposed over sheaves or pulleys 104 secured to a shaft 105, which is disposed to open bearings 106 in the frame 10.

In using the invention, butter is packed on the slats 33 in a series of layers in the manner which has been described, and the frame 10 is then rolled on its wheels and casters, into the cooling room, where the butter is hardened in the customary manner. This having been done, the frame 10 is wheeled to the frame 58 and the two frames are secured together, by means of the hooks 107, which are pivoted to the frame 10, and which engage the studs 108 on the frame 58. The shaft 105, with the endless sprocket chains 52 mounted on the pulleys 104 is then disposed in the open bearings 106. The clamps 38, the side members 35, and the end members 37 having been removed, the upper layers of butter are disposed on the upper series of slats 33, with the rear block 42 in position to press against the rear of the layer of butter the depending brackets 45 of the said block being in position to engage the said slats 33. The sprocket chains 52 are now connected with the extending members which have been described. This having been done, the operator turns the crank 83 which, by means of the link 97, the ratchet wheel 101, and the pawl 102, in connection with the sprocket wheels 103 and endless sprocket chains 52, will move the butter to the right and at the same time will move the slats 33 in this direction. The slats 33 at the extreme right will be pushed into the chute 55 one by one, as the butter previously disposed thereon is moved on to the shelves 56 and 62. As the crank 96 rotates it reciprocates the link 97 articulated to the arm 99. When the link 97 is moved to the left the pawls move freely on the teeth of the ratchet wheel 101, and the rotation of the shaft 100 is interrupted during this period in the operation of the machine, the teeth on the wheel 87 engaging the teeth on the gear wheel 88, by which means the shaft 89 is rotated, thereby rotating the crank 94 and operating the bell crank lever 93 by means of the link 95. As this takes place, the transverse member 71 is drawn downwardly, and returned to original position so that the wire 72 will make a vertical, transverse cut in the butter which has been deposited on the shelves 56 and 62, and which has been cut into sections by the wires 77. The wires 77 and the wires 72 in this way cut the butter into rectangular sections which are deposited on the shelf 62. When the handle 64 is drawn downwardly to the right, the sections of butter rest on the shelf member 63, and may be removed therefrom and wrapped in the customary manner. Or, if desired, the sections of butter may be carried away on the said shelf member 63, this shelf member being readily removable, from the arm 60 of the member 59. When the block 42 has been moved to the extreme right of the frame 10, and all the butter in the upper layer has been pushed on to the shelves 56 and 62, where it has been cut into sections, the block 42 may be freed from the sprocket chains in the manner which has been described, permitting the block to be moved readily to the left. This having been done, the next row of butter is moved upwardly, where it may be engaged by the block 42, and the slats supporting the layer may be engaged by the brackets 45. This is done by means of the hand wheel 30 in the manner described. It should be understood that the slats 33 move to the right with the butter, and are deposited in the chute 55.

Having thus described my invention, I claim as new and desire to secure by Letters Patent:

1. In a butter molding machine a frame, a support for the butter, means for moving the butter relatively to the frame, a shaft journaled in the frame, means by which the shaft is adapted for driving the first-mentioned means, a ratchet wheel secured to the shaft, an arm mounted loosely on the shaft, a pawl pivoted to the arm for engaging the ratchet wheel, a second shaft, a crank mounted on the second shaft, and having a slot, a screw disposed in the slot and journaled in bearings on the crank, a screw member mounted on the screw and having a pin, and a link articulated to the arm and to the pin.

2. In a butter molding machine a frame having runners and an open bearing, a shaft journaled in the open bearing, slats, means for supporting the slats, a block for traveling on the runners having a member for engaging one of the slats for moving it relatively to the runners, a sprocket wheel secured to the shaft, a second frame, means for locking the two frames together, a cutter mounted on the second frame, a shaft journaled in a bearing in the second frame, a sprocket wheel secured to the second-mentioned shaft, a sprocket chain connecting the two sprocket wheels, and means for detachably connecting the block with the sprocket chain.

3. In a butter molding machine a frame, side members, means for supporting the side members on the frame, two slides mounted on the side members, having depending flanges disposed against the outer sides of the side members, and upwardly extending flanges, slats disposed on the slides and within the upwardly extending flanges, additional side members disposed on the slats having depending flanges disposed against the ends of the slats, and means for supporting the additional side members.

4. In a butter molding machine an open frame having bearings, recesses and openings, wires connecting the opposite sides of the frame and disposed in the recesses, studs disposed in the openings for engaging the wires and for holding them in position, an additional frame having rods disposed for moving in the bearings, a wire connecting the rods, a lever, means for connecting one arm of the lever with the second-mentioned frame, and means for reciprocating the other arm of the lever.

5. In a butter molding machine a support for the butter, a shaft, means for moving the butter on the support, relatively to the shaft, means by which the shaft is adapted to operate the said means, a ratchet wheel secured to the shaft, an arm mounted loosely on the shaft, a pawl pivoted to the arm for engaging the ratchet wheel, an open frame secured relatively to the support for the butter, and having bearings, wires connecting opposite sides of the open frame, an additional frame having rods disposed for moving in the bearings, a wire connecting the rods, a lever, means for connecting one arm of the lever with the said additional frame, and means for rocking the first-mentioned arm and reciprocating the other arm of the lever synchronously.

6. In a butter molding machine a frame having runners, sprocket wheels journaled in the frame, members mounted on the frame for carrying the butter, a block having an orifice mounted for traveling on the runners, for engaging and moving the butter relatively thereto, a sprocket chain connecting the sprocket wheels, and a pin disposed in the orifice in the block and adapted to be inserted in a link of the sprocket chain for detachably connecting the block with the sprocket chain.

7. In a butter molding machine a frame having runners, sprocket wheels journaled in the frame, members mounted on the frame for carrying butter, a block having an orifice mounted for traveling on the runners for engaging and moving the butter relatively thereto, a sprocket chain disposed around the sprocket wheels, and a bent pin disposed in the orifice, one end of the pin being adapted to be inserted in a link of the sprocket chain for detachably connecting the block with the sprocket chain.

8. In a butter molding machine a frame having runners, sprocket wheels journaled in the frame, a slide mounted on the frame, slats disposed on the slide, a block having an orifice for traveling on the runners and having a member for engaging one of the slats to move it relatively to the runners, a sprocket chain connecting the sprocket wheels, and a pin disposed in the orifice in the block and adapted to be inserted in a link of the sprocket chain for detachably connecting the block and the sprocket chain.

9. In a butter molding machine a frame, a support for the butter, means for moving the butter relatively to the frame, a shaft journaled in the frame, means by which the shaft is adapted for driving the first-mentioned means, a ratchet wheel secured to the shaft, an arm mounted loosely on the shaft, a pawl mounted on the arm for engaging the ratchet wheel, a second shaft, a crank mounted on the second shaft, a link connecting the arm and the crank, a cutter frame, a lever pivoted to the first-mentioned frame and adapted for operating the cutter frame, a third shaft, a crank secured to the third-mentioned shaft, a link connecting the second-mentioned crank and the lever, a wheel having teeth disposed around a portion of its periphery, secured to the second-mentioned shaft, and a wheel having teeth disposed around a portion of its periphery, and meshing with the teeth on the second-mentioned shaft, secured to the third-mentioned shaft, the third-mentioned wheel having a concave surface for engaging the periphery of the second-mentioned wheel between the teeth of the second-mentioned wheel for locking the third-mentioned shaft against movement at predetermined times in the operation of the machine.

10. In a butter molding machine a frame, slides, means for supporting the slides on the frame, slats disposed on the slides adapted to convey butter relatively thereto, there being an opening at one end of the frame for receiving the slats when they are moved in the direction of the said end, and a bracket pivoted beyond the opening with members disposed transversely of the machine and to each other, one of the members serving as a shelf for receiving the butter.

11. In a butter molding machine a frame having four bearings, screws journaled in the bearings respectively, two transverse members, each having two threaded openings in which the screws mesh respectively, members supported by the transverse members on which butter may be deposited, a shaft journaled in additional bearings in the frame, and a belt disposed around the screws and the shaft, by which the screws may be rotated simultaneously by the shaft.

12. In a butter molding machine a frame, a support for the butter, a cutter frame mounted on the first-mentioned frame, means for moving the butter in the direction of the cutter frame, a shaft journaled in the first-mentioned frame, means by which the shaft is adapted for driving the first-mentioned means, a ratchet wheel secured to the shaft, an arm mounted loosely on the shaft, a pawl pivoted to the arm for engaging the ratchet wheel, a second shaft, a crank secured to the second shaft, a link connecting the arm and the crank, a third shaft, gearing connecting the second and third-mentioned shafts, a crank mounted on the third-mentioned shaft, a bell crank lever pivoted to the frame, a link connecting one arm of the bell crank lever with the last-mentioned crank, a movable member mounted on the cutter frame, and means connecting the movable member with the other arm of the bell crank lever.

13. In a butter molding machine a frame having runners, a slide mounted on the frame, slats disposed in the slide, a block for traveling on the runners having a member for engaging one of the slats to move it relatively to the runners, a second frame, a cutter frame mounted thereon, a shaft journaled in the first-mentioned frame, a shaft journaled in the second-mentioned frame, sprocket wheels mounted on the shafts, a sprocket chain connecting the sprocket wheels, means for connecting the block with the sprocket chain, a ratchet wheel secured to the second-mentioned shaft, an arm mounted loosely on the second-mentioned shaft, a pawl pivoted to the arm for engaging the ratchet wheel, a third shaft, a crank secured to the third-mentioned shaft, and a link connecting the arm and the crank.

14. In a butter molding machine a frame, a member having two arms secured together, and disposed at an angle to each other, the member being pivoted to the frame and being adapted to receive and transfer the butter.

15. In a butter molding machine a frame, a member having two arms secured together, and disposed at an angle to each other, the member being pivoted to the frame, a removable shelf disposed transversely of the machine and resting against one of the arms, the pivoted member being adapted to receive and transfer butter which may be removed from the said removable shelf.

16. In a butter molding machine a frame, a support for the butter, means for moving the butter relatively to the frame, a shaft journaled in the frame, means by which the shaft is adapted for driving the first-mentioned means, a ratchet wheel secured to the shaft, an arm mounted loosely on the hub of the ratchet wheel, a plurality of pawls mounted on the arm for engaging the ratchet wheel, the pawls being of different lengths so that they will be disposed in a plurality of positions relatively to the teeth of the ratchet wheel, a second shaft, a crank having a slot secured to the second shaft, a crank pin having a threaded orifice adapted to travel in the slot, a screw journaled in bearings in the crank which meshes in the threaded orifice in the crank pin, and a link articulated to the arm and to the crank pin.

17. In a butter molding machine a frame, a support for the butter, means for moving the butter relatively to the frame, a shaft journaled in the frame, means by which the shaft is adapted for driving the first-mentioned means, a ratchet wheel secured to the shaft, an arm mounted loosely on the hub of the ratchet wheel, a pawl mounted on the arm for engaging the ratchet wheel, a second shaft, a crank having a slot secured to the second shaft, a crank pin having a threaded orifice adapted to travel in the slot, a screw journaled in bearings in the shaft, which meshes in the threaded orifice in the crank pin, and a link articulated to the arm and to the crank pin.

In testimony whereof I have signed my name to this specification in the presence of two subscribing witnesses.

JENS NIELSEN JACOBSEN.

Witnesses:
  T. Y. KRAMER,
  LOUIS P. DOORIS.

---

Copies of this patent may be obtained for five cents each, by addressing the "Commissioner of Patents, Washington, D. C."